(12) United States Patent
Weiss et al.

(10) Patent No.: US 6,948,358 B2
(45) Date of Patent: Sep. 27, 2005

(54) METHOD FOR DIAGNOSING INCORRECT VALVE LIFT ADJUSTMENT IN AN INTERNAL COMBUSTION ENGINE

(75) Inventors: Frank Weiss, Pentling/Glasslfing (DE); Hong Zhang, Tegernheim (DE)

(73) Assignee: Siemens Aktiengesellschaft, Munich (DE)

(*) Notice: Subject to any disclaimer, the term of this patent is extended or adjusted under 35 U.S.C. 154(b) by 150 days.

(21) Appl. No.: 10/614,346

(22) Filed: Jul. 8, 2003

(65) Prior Publication Data

US 2005/0044934 A1 Mar. 3, 2005

(30) Foreign Application Priority Data

Jul. 9, 2002 (DE) .......................................... 102 30 899

(51) Int. Cl.[7] ............................................. G01M 15/00
(52) U.S. Cl. .................................................... 73/119 R
(58) Field of Search .............................. 73/116, 117.2, 73/117.3, 118.1, 119 R

(56) References Cited

U.S. PATENT DOCUMENTS

| | | | |
|---|---|---|---|
| 4,957,074 A | * | 9/1990 | Weissler et al. ......... 123/90.11 |
| 5,060,604 A | | 10/1991 | Seki et al. |
| 5,641,891 A | * | 6/1997 | Frankl et al. ................. 73/1.72 |
| 5,775,355 A | * | 7/1998 | Maier et al. .................... 137/1 |
| 5,921,219 A | * | 7/1999 | Frohlich et al. ............ 123/399 |
| 6,288,409 B1 | * | 9/2001 | Maier et al. ............. 250/559.4 |
| 6,408,685 B2 | * | 6/2002 | Shin ............................ 73/116 |
| 2003/0230280 A1 | * | 12/2003 | Allston et al. .............. 123/403 |
| 2003/0230281 A1 | * | 12/2003 | Hoshino ................ 123/406.29 |
| 2004/0129249 A1 | * | 7/2004 | Kondo ........................ 123/346 |

FOREIGN PATENT DOCUMENTS

| | | |
|---|---|---|
| DE | 69021139 T2 | 4/1996 |
| DE | 19520117 A1 | 12/1996 |

OTHER PUBLICATIONS (2000) "The New Motor of the Porsche 911 Turbo," Automotive Engineering Magazine 61(11)–Statement of Relevancy provided in the Information Disclosure Statement.

* cited by examiner

Primary Examiner—Eric S. McCall
(74) Attorney, Agent, or Firm—Morrison & Foerster LLP

(57) ABSTRACT

If, when a valve lift adjustment is triggered in an inlet valve of an internal combustion engine, no valve lift adjustment actually takes place due to a defect in the adjustment mechanism, the air/fuel ratio (lambda) or even a different operating parameter for example the engine speed and torque changes in an unintended manner. By monitoring this operating parameter the operation control device can deduce a defect in the adjustment mechanism.

12 Claims, 2 Drawing Sheets

METHOD FOR DIAGNOSING INCORRECT VALVE LIFT ADJUSTMENT IN AN INTERNAL COMBUSTION ENGINE

CLAIM FOR PRIORITY

This application claims priority to German Application No. 10230899.3, which was filed in the German language on Jul. 9, 2002.

TECHNICAL FIELD OF THE INVENTION

The present invention relates to a method for diagnosing a defect in an adjustment mechanism, and in particular, for adjusting the valve lift of at least one inlet valve in an internal combustion engine, the operation of which is regulated by an operation control device.

BACKGROUND OF THE INVENTION

Internal combustion engines with inlet valves, the valve lift of which can be adjusted continuously or discretely by means of an adjustment mechanism, are used with increasing frequency in vehicles, see for example DE 195 20 117 and MTZ Motortechnische Zeitschrift (Automotive Engineering Magazine) 61 (2000) 11, pages 730–743. In this case, the adjustment mechanism can become defective resulting in the valve lift obtained not as expected. This error results in an increase in pollutant emissions and a corresponding discrepancy between the required torque and the torque actually delivered. This situation can be identified using a valve lift sensor. However an additional sensor of this kind requires a corresponding outlay.

SUMMARY OF THE INVENTION

The present invention discloses a method for diagnosing incorrect valve lift adjustment of an inlet valve in an internal combustion engine, which does not require a valve lift sensor.

In one embodiment of the present invention, certain operating parameters of the internal combustion engine are set to a target value, for example a constant target value, in the event of actual adjustment of the valve lift by the operation control device, but in the event of a defect in the adjustment mechanism, the operating parameters differ significantly from the target value, when a valve lift adjustment is triggered but not executed. The operation control device can then deduce a defect in the adjustment mechanism on the basis of such a discrepancy between this operating parameter and the target value.

The preferred operating parameter for this purpose is the air/fuel ratio (lambda). If, for example, the operation control device triggers the adjustment mechanism, to switch from a small valve lift to a large valve lift, and no valve lift adjustment is made in this situation due to a defect in the adjustment mechanism, the operation control device will execute the fuel injection operation according to the target values for the large valve lift. As the inlet valve in its smaller valve lift position admits a correspondingly smaller quantity of air into the associated cylinder, a richer air/fuel ratio will be obtained. This change in the air/fuel ratio is identified by the existing lambda probe and the operation control device deduces a defect in the adjustment mechanism from this. It is clear that in principle the same method applies, when the operation control device switches from a large valve lift to a small valve lift.

As mentioned above, the air/fuel ratio in particular is a suitable operating parameter to monitor for the diagnosis according to the invention, as an incorrect valve lift adjustment can be identified particularly clearly from a change in the air/fuel ratio. However, other operating parameters, for example suction pipe pressure, mass air flow, engine speed or torque, can also be used as operating parameters for the diagnosis according to the invention, as these operating parameters also change when valve lift adjustment is triggered but not executed. However, monitoring the air/fuel ratio is preferred because it is more reliable.

In the case of a multi-cylinder internal combustion engine, the invention can be implemented individually for each cylinder, so that each individual adjustment mechanism can then be diagnosed.

The diagnosis method according to the invention can be used with internal combustion engines with both continuous and discrete valve lift adjustment. It is preferably used with internal combustion engines with discrete valve lift adjustment, as in this case a defect in the adjustment mechanism results in a sudden change in the monitored operating parameter.

When the operation control device identifies a defect in the adjustment mechanism, it proceeds to regulate the operation of the internal combustion engine according to the current valve lift of the inlet valve. Advantageously, it also activates an error display, so that any further switching attempts are prevented.

BRIEF DESCRIPTION OF THE DRAWINGS

Further details of the invention are described using the drawings, in which.

DETAILED DESCRIPTION OF THE INVENTION

Figure 1:
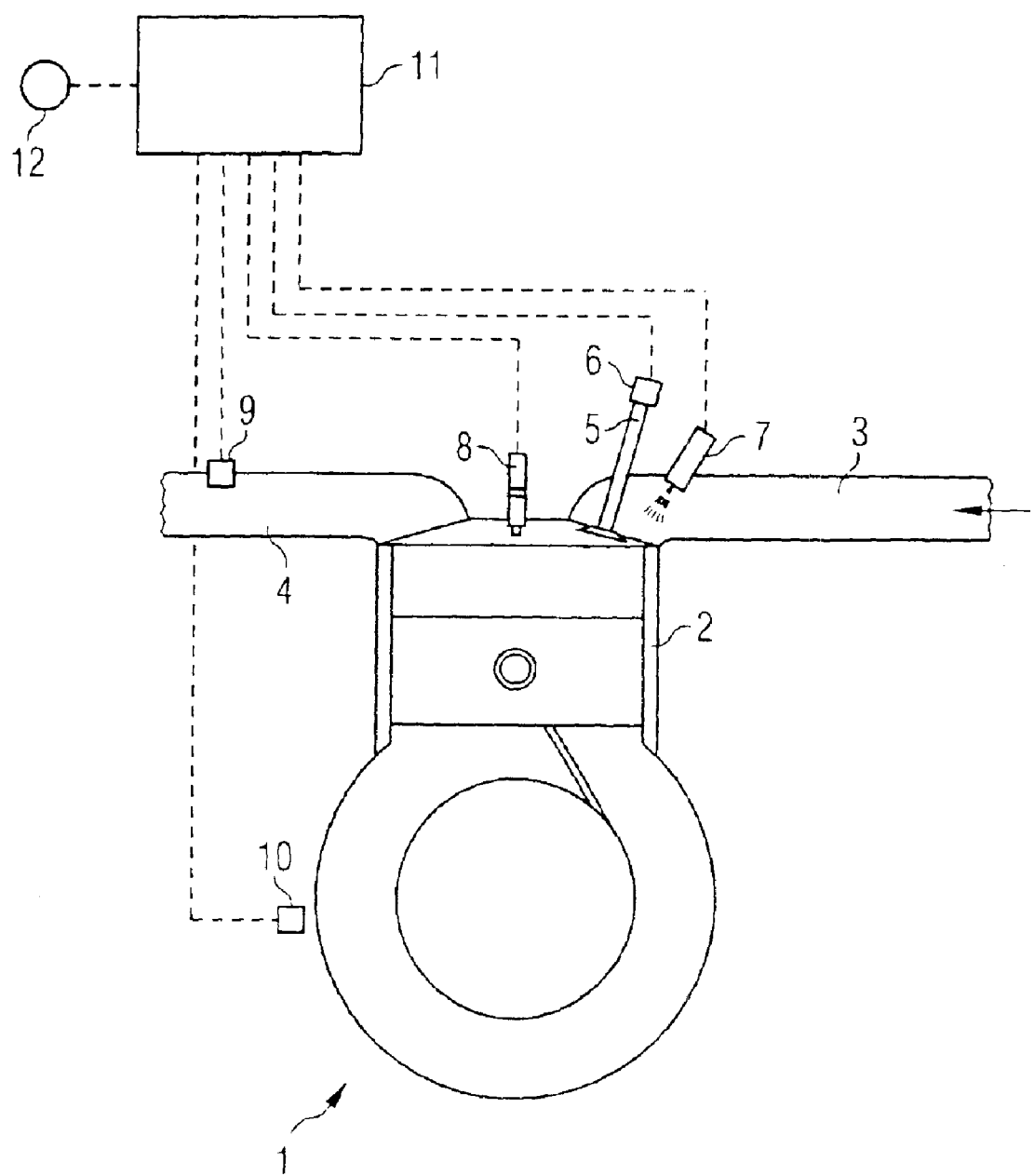
FIG. 1 shows an internal combustion engine with an operation control device.

FIG. 1 shows a diagram of an internal combustion engine 1 of the spark ignition type with a number of cylinders 2 (of which only one is shown), an intake tract 3, an exhaust tract 4, an inlet valve 5, an outlet valve (not shown), an actuator with an adjustment mechanism 6 for adjusting the valve lift of the inlet valve 5, an injection valve 7 for injecting fuel and a spark plug 8. There is also a lambda probe 9 in the exhaust tract 4 to detect the air/fuel ratio (lambda value). An additional sensor 10 is provided where necessary and can be configured as an engine speed or torque sensor.

Operation of the internal combustion engine 1 is regulated by an operation control device 11, which receives signals, as shown by broken lines, from the lambda probe 9 and where necessary the sensor 10 as well as from further sensors (not shown) and processes them to control commands, which are used to control activation of the inlet valve 5, the injection valve 7 and the spark plug 8, among other things.

The adjustment mechanism 6 is for example configured so that it can adjust the inlet valve 5 between a small and large valve lift, in other words to execute a discrete valve lift adjustment. The operation control device 11 is designed so that it can diagnose a defect in the adjustment mechanism 6 as follows.

When the operation control device 11 transmits a control command to the adjustment mechanism, to switch the inlet valve 5 for example from the small valve lift to the large valve lift, and the adjustment mechanism 6 does not actually execute this valve lift adjustment due to a defect, the operation control device 11 does not initially identify this error in the absence of a corresponding valve lift sensor. The operation control device 11 therefore activates the injection valve 7, to inject a larger quantity of fuel to correspond to the large valve lift. However, as the inlet valve 5, which has remained in the small valve lift position, admits a correspondingly smaller quantity of air into the cylinder 2, a richer air/fuel ratio is obtained in the cylinder 2. This change in the air/fuel ratio is detected by the lambda probe 9, which transmits the changed lambda value to the operation control device 11. The operation control device 11 then identifies from a comparison of target and actual values for the air/fuel ratio that this has changed inadmissibly. From this the operation control device 11 deduces a defect in the adjustment mechanism 6.

The operation control device 11 then changes the regulation of the internal combustion engine so that all actuators, including the actuator for the injection valve 7 are triggered to correspond to the small valve lift of the inlet valve 5. The operation control device 11 also transmits an error signal to an error display 12, which informs the driver that a corresponding error has occurred.

Figure 2:
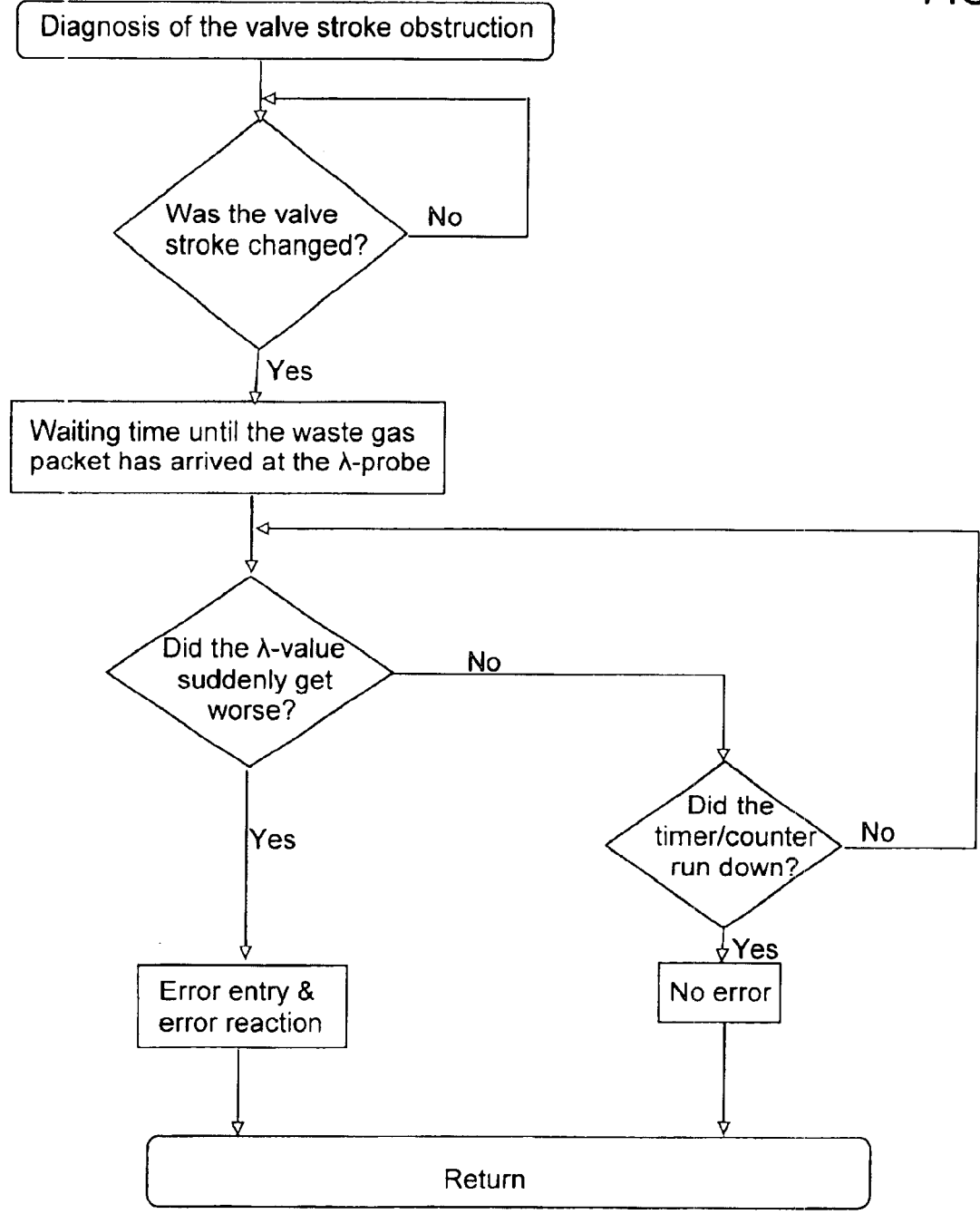
FIG. 2 is a flow diagram of an embodiment of the invention for diagnosing a defect in a valve lift adjustment mechanism.

One example of the described method is shown in the flow diagram in FIG. 2. If the result of the inquiry in stage 13 is that the valve lift has been changed, a timer or counter in the operation control device 11 is started (stage 14). This opens up a time window of for example ½ to 1 sec., which corresponds to the maximum time required by the exhaust gas to travel the distance from the cylinder to the lambda probe.

If the result of the inquiry according to stage 15 is that the lambda value has not changed suddenly, it is verified in stage 16 whether the timer or counter has expired. If not the routine reverts to stage 15. If the lambda value has not changed suddenly (stage 15) and the timer or counter has expired (stage 16), this means that no error has occurred in the valve lift adjustment (stage 17). If, however, the result of the inquiry at stage 15—within the time window—is that the lambda value has changed suddenly, this results as described above in an error input and a corresponding error response (stage 18).

As stated above, a different operating parameter such as for example suction pipe pressure, mass air flow, engine speed or torque of the internal combustion engine 1 could be used for the diagnosis method described instead of the air/fuel ratio. For this purpose, the signal of the sensor 10 or a different sensor would be used, which directly or indirectly identifies the relevant operating parameter. Otherwise, however, the diagnosis method operates as described above.

If necessary the signals from the lambda probe and an additional sensor could also be used jointly in the diagnosis method. This could be advantageous for example for diagnosing an adjustment mechanism for continuous adjustment of the valve lift, with which a small triggered valve lift adjustment results in a correspondingly small discrepancy between the monitored operating parameter and a target value in the event of a defect.

What is claimed is:

1. A method for diagnosing a defect in an adjustment mechanism for adjusting a valve lift of at least one inlet valve in an internal combustion engine, the operation of which is regulated by an operation control device, comprising:

monitoring an operating parameter of the internal combustion engine, which is set to a target value when the valve lift is actually adjusted by the operation control device;

deducing a defect in the adjustment mechanism from a discrepancy between the operating parameter and the target value when a valve lift adjustment is triggered; and wherein the operation control device is configured so that on identification of a defect in the adjustment mechanism it regulates the operation of the internal combustion engine according to an actual lift of an inlet valve at a time of an activated valve lift adjustment and wherein the monitored operating parameter is an air/fuel ratio.

2. The method according to claim 1, wherein the operation is carried out individually for each cylinder in the internal combustion engine.

3. The method according to claim 1, wherein the method is performed in the internal combustion engine with discrete valve lift adjustment.

4. The method according to claim 1, wherein the operation control device activates an error display on identification of a defect in the adjustment mechanism.

5. A method for diagnosing a defect in an adjustment mechanism for adjusting a valve lift of at least one inlet valve in an internal combustion engine, the operation of which is regulated by an operation control device, comprising:

monitoring an operating parameter of the internal combustion engine, which is set to a target value when the valve lift is actually adjusted by the operation control device;

deducing a defect in the adjustment mechanism from a discrepancy between the operating parameter and the target value when a valve lift adjustment is triggered; and wherein the operation control device is configured so that on identification of a defect in the adjustment mechanism it regulates the operation of the internal combustion engine according to an actual lift of an inlet valve at a time of an activated valve lift adjustment and wherein the monitored operating parameter is a speed or torque of the internal combustion engine.

6. The method according to claim 5, wherein the operation is carried out individually for each cylinder in the internal combustion engine.

7. The method according to claim 5, wherein the method is performed in the internal combustion engine with discrete valve lift adjustment.

8. The method according to claim 5, wherein the operation control device activates an error display on identification of a defect in the adjustment mechanism.

9. A method for diagnosing a defect in an adjustment mechanism for adjusting a valve lift of at least one inlet valve in an internal combustion engine, the operation of which is regulated by an operation control device, comprising:

monitoring an operating parameter of the internal combustion engine, which is set to a target value when the valve lift is actually adjusted by the operation control device;

deducing a defect in the adjustment mechanism from a discrepancy between the operating parameter and the target value when a valve lift adjustment is triggered; and wherein the operation control device is configured so that on identification of a defect in the adjustment mechanism it regulates the operation of the internal combustion engine according to an actual lift of an inlet valve at a time of an activated valve lift adjustment and wherein the monitored operating parameter is a pressure or mass air flow in a suction pipe of the internal combustion engine.

10. The method according to claim 9, wherein the operation is carried out individually for each cylinder in the internal combustion engine.

11. The method according to claim 9, wherein the method is performed in the internal combustion engine with discrete valve lift adjustment.

12. The method according to claim 9, wherein the operation control device activates an error display on identification of a defect in the adjustment mechanism.

* * * * *